United States Patent [19]

Chang et al.

[11] 4,231,892
[45] Nov. 4, 1980

[54] MANGANESE DOPED ZINC SILICATE LUMINESCENT PHOSPHORS WITH III-V OXIDE SUBSTITUTIONS

[75] Inventors: Ifay F. Chang, Chappaqua; Merrill W. Shafer, Yorktown Heights, both of N.Y.

[73] Assignee: International Business Machines Corporation, Armonk, N.Y.

[21] Appl. No.: 17,521

[22] Filed: Mar. 5, 1979

[51] Int. Cl.$^3$ ............................................. C09K 11/44
[52] U.S. Cl. ........................ 252/301.6 F; 252/301.6 P
[58] Field of Search ............... 252/301.6 F, 301.6 P, 252/301.4 F, 301.4 P

[56] References Cited

U.S. PATENT DOCUMENTS

| | | | |
|---|---|---|---|
| 2,109,984 | 3/1938 | Aicher | 252/301.6 F |
| 2,241,939 | 5/1941 | Aschermann et al. | 252/301.6 F |
| 2,554,999 | 5/1951 | Merrill et al. | 252/301.6 F |
| 3,535,267 | 10/1970 | Sarver | 252/301.6 F |
| 3,984,587 | 10/1976 | Lipp | 252/301.6 F |

FOREIGN PATENT DOCUMENTS 162519 4/1955 Australia ..................... 252/301.6 F

OTHER PUBLICATIONS

Inove, "Chem. Abstracts", vol. 82, 1975, 132611c.

*Primary Examiner*—Jack Cooper
*Attorney, Agent, or Firm*—Bernard N. Wiener

[57] ABSTRACT

A series of solid solutions in the systems $Zn_2SiO_4$-$Zn_2M^{+3}{}_{.5}M^{+5}{}_{.5}O_4$, is synthesized by practice of this disclosure. Solid reaction technique is used where $M^{+3}$ and $M^{+5}$ signify ions from Groups III and V of the periodic table.

Large increases in the efficiency compared to the prior art P1 phosphor ($Zn_2 SiO_4$:Mn) are achieved by substituting various combinations of Group III and V oxides for $SiO_2$, e.g., Al and P to provide $Zn_{2-y}Mn_ySi_{1-2x}Al_xP_xO_4$. The photoluminescence efficiency of the phosphors of this disclosure exhibit strong dependence on the III-V substitution concentration, x, having highest efficiency for the approximate range of x=0.25% to 1.5%.

5 Claims, 5 Drawing Figures

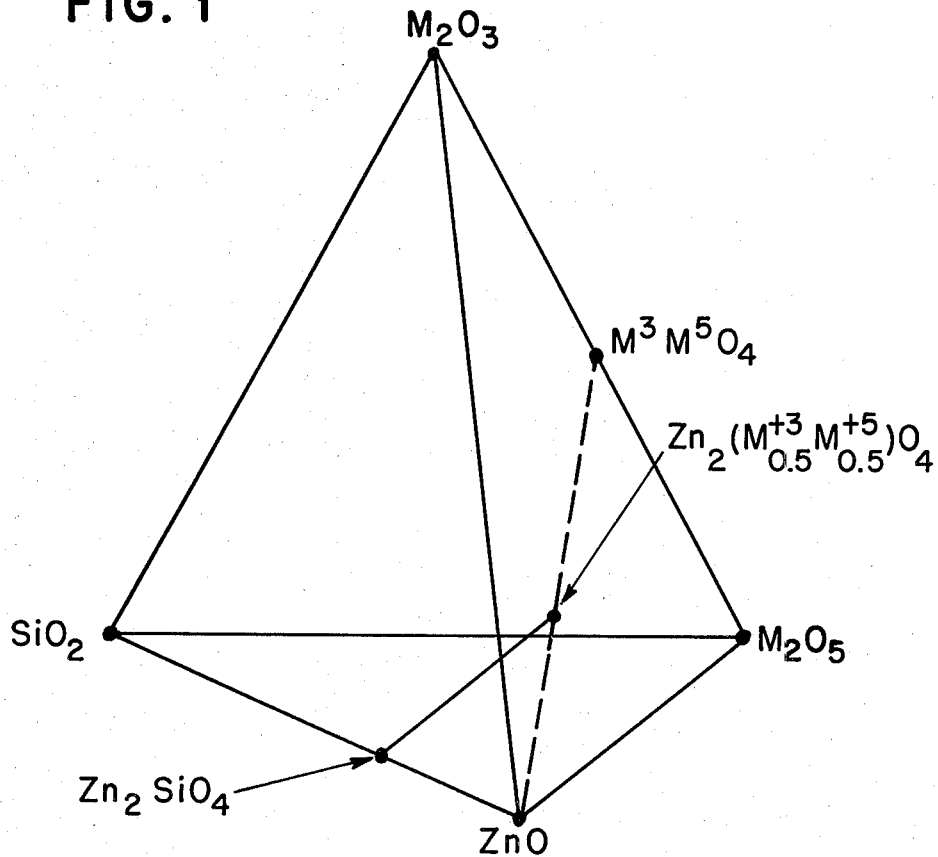

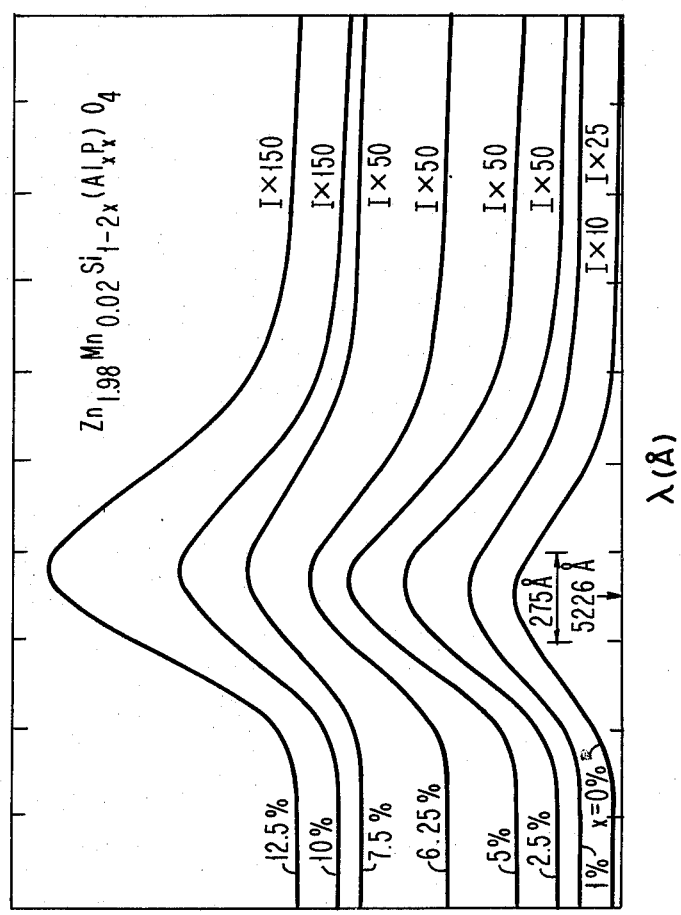

MANGANESE DOPED ZINC SILICATE LUMINESCENT PHOSPHORS WITH III-V OXIDE SUBSTITUTIONS

BACKGROUND OF THE INVENTION

Manganese activated zinc silicate (commercially referred as P1) is a very efficient green emitting phosphor second only to copper activated zinc sulfide. P1 has been extensively used in many cathode ray tube displays. When arsenic is added to the Mn activated zinc silicate, the phosphor (P39) exhibits long persistence (150 millisec. at 10% point) in cathodoluminescence. Although the latter phosphor has useful applications in storage cathode-ray-tubes (CRT) and computer displays, there is very little prior art revealing the exact role of As in the silicate system.

OBJECTS OF THE INVENTION

It is an object of this invention to provide luminescent phosphors in a series of compositions which have high efficiency and tailorable persistence.

It is another object of this invention to provide a group of luminescent phosphors which contain equal concentrations of group III and group V oxide combinations: $AlPO_4$, $GaPO_4$, $BPO_4$, $AlAsO_4$, $GaAsO_4$ and $BAsO_4$ wherein these oxide combinations replace part of the $SiO_2$ in comparable $Zn_2SiO_4$:Mn phosphor.

It is another object of this invention to provide a method of preparation of the luminescent phosphors of the preceding object.

SUMMARY OF THE INVENTION

A series of solid solutions in the systems $Zn_2SiO_4$-"$Zn_2M_{0.5}{}^{+3}M_{0.5}{}^{+5}O_4$" is synthesized by solid state reaction technique for the practice of this invention, where $M^{+3}$ and $M^{+5}$ signify ions from Groups III and V of the periodic table. "$Zn_2M_{0.5}{}^{+3}M_{0.5}{}^{+5}O_4$" is placed within quotation marks to signify that this composition is a hypothetical one which has never been actually synthesized. The extent of the solid solutions with several $M^{+3}$ and $M^{+5}$ combination is determined for practice of this invention. The luminescence properties of the III-V substituted Mn activated silicate phosphors of this invention are investigated for the practice of this invention. These materials when activated with manganese exhibit $Mn^{++}$ green emission, and are suitable for luminescent phosphor applications.

Large increases in the efficiency compared to the prior art P1 phosphor ($Zn_2SiO_4$:Mn) are achieved by substituting various combinations of Groups III and V oxides for $SiO_2$, e.g., Al and P to provide $Zn_{2-y}Mn_ySi_{1-2x}Al_xP_xO_4$; wherein $0 < y \leq 0.25$ and $0 < x < 0.5$. The photoluminescence efficiency of the phosphors of this invention exhibit strong dependence on the III-V substitution concentration, x, having highest efficiency for the approximate range of x=0.25% to 1.5%. Cathodoluminescence and decay measurements show that such materials have cathodoluminescence efficiency greater than the prior art zinc silicates and with comparable persistence characteristics.

BRIEF DESCRIPTION OF THE DRAWINGS

FIG. 1 is a composition phase diagram for the system $ZnO$-$SiO_2$-$M^{+3}M^{+5}O_4$, where $M^{+3}$=elements from Group III and $M^{+5}$=elements from Group V of the periodic table. The solid line between two solid dots labelled $Zn_2SiO_4$ and $Zn_2(M_{0.05}{}^{+3}M_{0.5}{}^{+5})O_4$ shows the composition range.

FIG. 2 presents data on the phosphors of the invention where

FIG. 3 presents a series of graphs showing the photoluminescence spectra of phosphor $Zn_{1.98}Mn_{0.02}Si_{1-2x}(Al_x,P_x)O_4$ of this invention.

EXPERIMENTS FOR THE INVENTION

Detailed photoluminescence and phosphorescence measurements have been made on the materials synthesized for the practice of this invention. It was observed that the luminescence peak of $Mn^{++}$ shifts to longer wavelength, varies in intensity and decays with time as a function of the "$Zn_2M_{0.5}{}^3M_{0.5}{}^5O_4$" concentration. For example, at 1 mol. % concentration of "$Zn_2M_{0.5}{}^3M_{0.5}{}^5O_4$" significantly long persistence in phosphorescence has been measured. Apparently there are two decay processes, one which is exponential and the other which is a low intensity slow decay lasting to minutes.

PRACTICE OF THE INVENTION

Among known phosphors, the manganese activated zinc silicate is an efficient green emitting cathodoluminescent phosphor as described by R. C. Alig et al, J. Electrochem. Soc. 124, 1136, 1977 and W. Lehmann, J. Electrochem. Soc. 118, 1164, 1971. This phosphor has been known for many years in mineral form as willemite. R. C. Herrman et al, Phys. Rev. 59, 79, 1941 use the willemite terminology. It is known in commercial products as P1 as described by the Publication No. 16-C, Nov. 1975 of the Electronic Industries Association Electron Tube Council. Extremely long persistence is achieved when P1 is codoped with As and is known as P39. Both P1 and P39 have been extensively used in many information display cathode ray tubes and storage tubes because of their high efficiencies, considerable electron burn resistance and long persistence characteristics. In spite of long and extensive usage of these prior art phosphors, there has been little systematic investigation and accomplishment to optimize or to understand the luminescence process therein.

Part of the $SiO_2$ in $Zn_2SiO_4$ is replaced with various combinations of the Group III and Group V oxides, which are model structures of $SiO_2$, in the practice of this invention. The effect of $M^3M^5O_4$ substitutions are described in greater detail hereinafter. FIG. 1 shows a phase diagram illustrating the compositions obtained through the practice of this invention.

The luminescence efficiency is a strong function of the $M^3M^5O_4$ substitution. Illustratively, highest efficiency was obtained in examples when the concentration was approximately 0.25% to 1.5% of the $SiO_2$. The substituted luminescent phosphors of this invention have significantly higher efficiencies than do the prior art P1 phosphor and have comparable or better persistence characteristics.

PREPARATION OF LUMINESCENT PHOSPHORS OF THE INVENTION

Figure 2A:
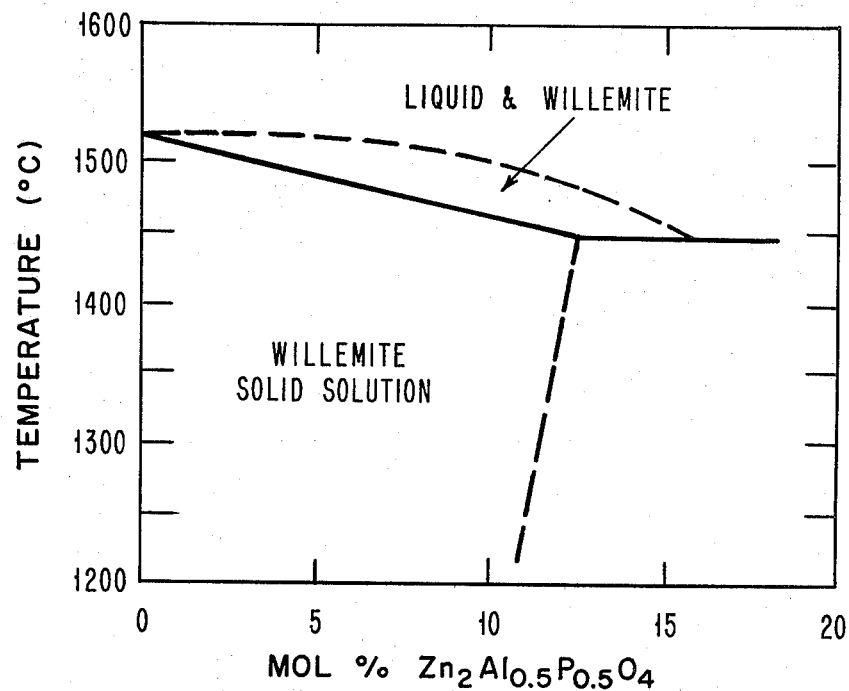
FIG. 2A is a graphical presentation of solubility and FIG. 2B is a graphical presentation of lattice constants of $Zn_2Si_{1-2x}Al_xP_xO_4$.
Figure 2B:
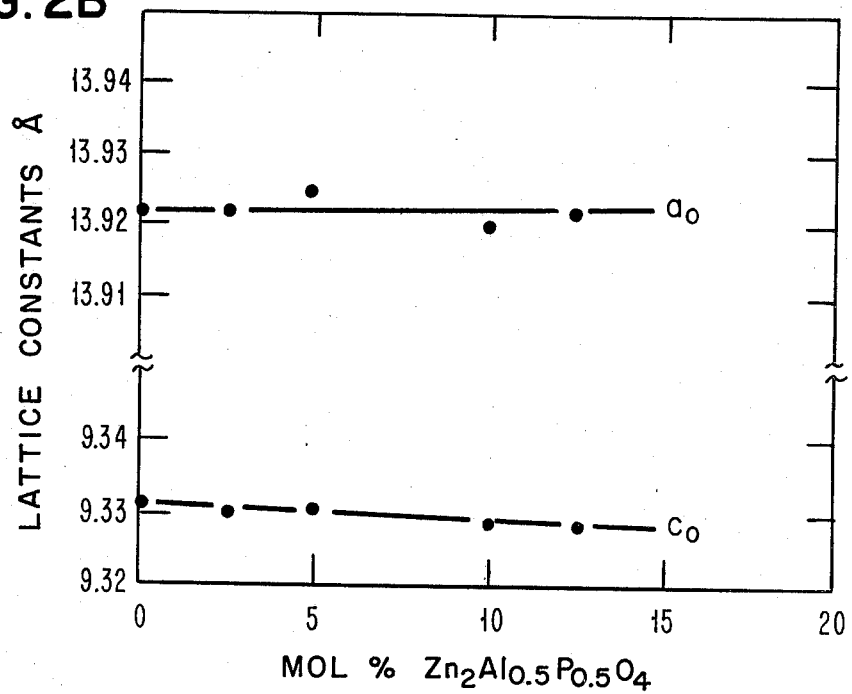

Standard crystal chemical techniques were used to replace systematically the $SiO_2$ with $M^3M^5O_4$, e.g. $AlPO_4$. The phosphors were synthesized by solid state reaction technique. The assayed starting materials, for example, $ZnCO_3$, $MnCO_3$, $SiO_2$ and $AlPO_4$ were first calcined at 805° C. and then calcined at 1000° C. They were then pressed and fired several times at higher temperatures (in some cases up to 1450°), until a single phase product with the willemite stucture was formed. Phase identification was accomplished by both X-ray powder diffraction and microstructure analyses. Conventional metallographic techniques were used because dense sintered pellets were formed at these high reaction temperatures. Weight loss measurements and electron microprobe analyses were also used to determine the final compositions. The Group III-V oxides were synthesized by a procedure similar to one described by E. C. Shafer et al, J. Am. Ceram. Soc. 39, 330, 1956, and Z. Kristallography, 108, 263, 1956. A limited solid solution of "$Zn_2M_{0.5}^3M_{0.5}^5O_4$" in $Zn_2SiO_4$ was formed by the procedure. However, the pure compound "$Zn_2M_{0.5}^3M_{0.5}^5O_4$", e.g., $Zn_2Al_{0.5}P_{0.5}O_4$, could not be synthesized. FIG. 2A is a composition vs. temperature diagram showing the approximate limit of this solubility, i.e., ~15%. The lattice constants determined for the solid solutions are shown in FIG. 2B.

The phosphors obtained by the practice of this invention are generally white, dense, single phase solids which exhibit photoluminescence with $Mn^{++}$ green emission peaked near 5230 Å. Comparable $Mn^{++}$ green emission is described by: A. L. N. Stevels et al, J. Luminescence, 8, 443, 1974; D. T. Palumbo et al, J. Electrochem. Soc. 117, 1184, 1970; E. Nagy, J. Opt. Soc. Am. 40, 407, 1950; and R. E. Shrader, J. Opt. Soc. Am. 39, 699, 1949.

An exemplary set of photoluminescent spectra of a 2% Mn doped phosphor series ($AlPO_4=0$ to 12.5%) prepared in accordance with the principles of this invention is shown in FIG. 3. The 2536 Å excited emission band is shifted toward longer wavelengths with increasing amounts of $AlPO_4$ substitution. Similar shifts are also observed with excitation of 3021 Å. The scale factor which is labelled on each spectrum in FIG. 3 also indicates that the photoluminescent peak intensity varies with $AlPO_4$ concentration. The photoluminescent efficiency of this phosphor series peaks at about concentration $x=1\%$. Measurements were made on another series of phosphors prepared in accordance with the principles of this invention, with Mn concentration varying between 0.25 to 2%. They indicate consistently high photoluminescent efficiency for examples of this invention having $AlPO_4$ concentration $x=0.25\%$ to 1.5%. The reaction temperature for the formation of willemite phase structure is lowered by the addition of $AlPO_4$, e.g., 5% lowers it about 50° C.

Figure 4:
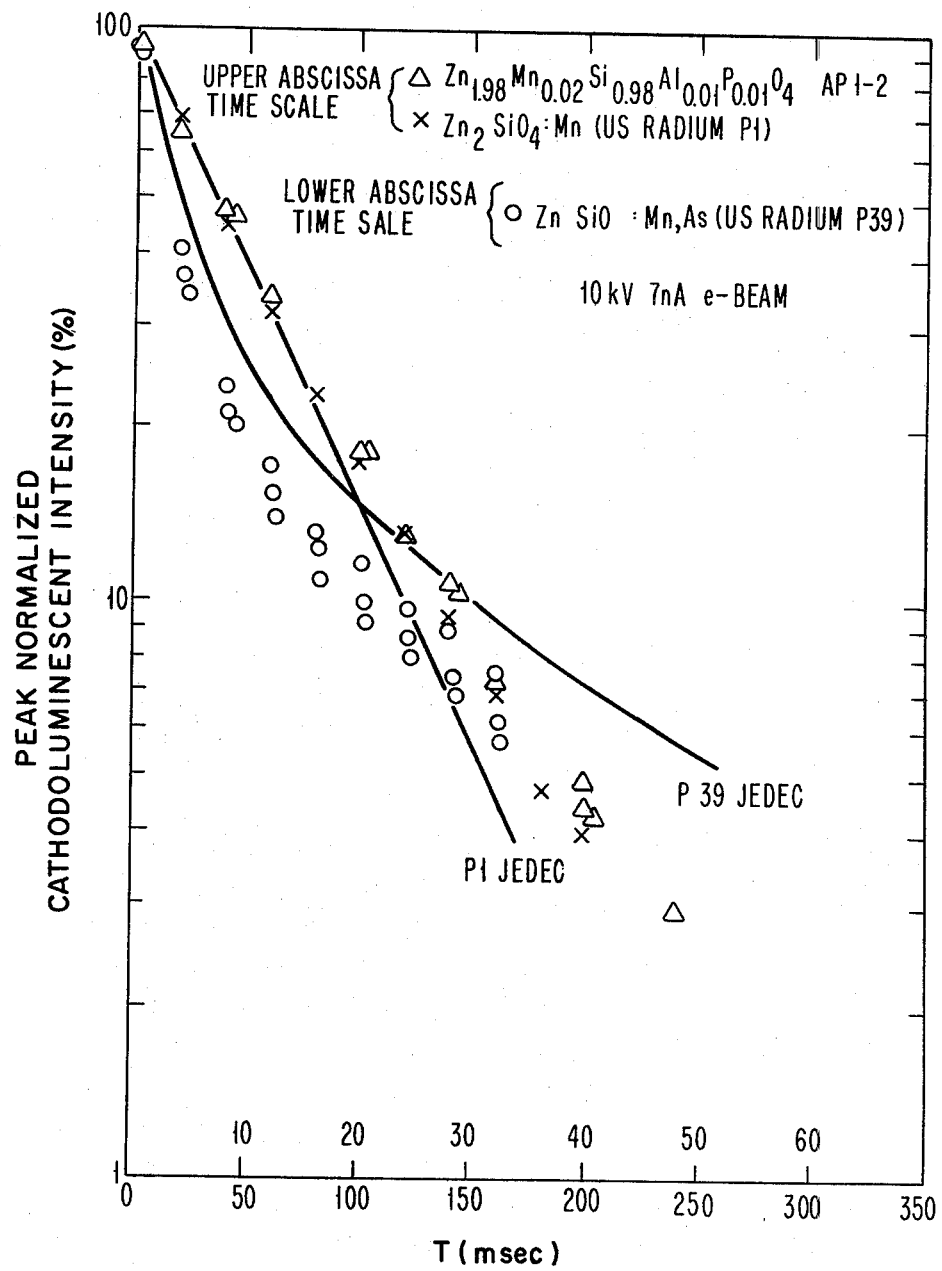
FIG. 4 is a graphical presentation of cathodoluminescence decay curves for $Zn_{1.98}Mn_{0.02}Si_{0.98}Al_{0.01}P_{0.01}O_4$ of this invention and for prior art phosphors P1 and P39.

Some examples of luminescent phosphors of this invention were ground into powders and settled on a screen along with powdered examples of prior art P1 and P39 phosphors. Comparisons were made of cathodoluminescence efficiencies and decay characteristics of the $AlPO_4$ substituted materials of this invention with those of commercial silicate phosphors. The cathodoluminescent intensity as a function of time for an example of this invention which contained 2% Mn and 1% $AlPO_4$ is compared in FIG. 4 with these characteristics of commercial P1 and P39 phosphors. The decay intensity is normalized in FIG. 4 with the steady state or initial intensity. The persistence behavior of these examples can be characterized by their decay to 10% point as 28.5 msec for the example of this invention, 27 msec for P1 and 110 msec for P39. Absolute luminous efficiency measurement was attempted by measuring cathodoluminescent brightness on a phosphor layer example of this invention in transmission mode.

An efficiency of 31.4 lumen/watt was obtained using 10 KeV electron beam excitation for a screen having thickness of approximately 40 microns phosphor of the latter example of this invention. Similar measurements for an example of commercial P1 prepared in the same manner gives 17.0 lumens/watt. The latter result agrees with data reported by R. C. Alig et al, J. Electrochem. Soc. 124, 1136, 1977, and W. Lehmann, J. Electrochem. Soc. 118, 1164, 1971: based on the work of A. Bril et al, Philips Res. Rept. 7, 401, 1952, and H. C. Hamaker, Philips Res. Rept. 2, 55, 1947, for calculating absolute luminous efficiency for a thick screen. Considerations are absorption and scattering losses in the phosphor layer and 85% reduction in efficiency for 10 KeV electron beam excitation.

THEORY FOR THE INVENTION

The efficiencies of silicate phosphors are not explicable by contemporary theoretical models. Therefore, there is no presentation herein of a precise explanation as to why the $AlPO_4$ and other $M^3M^5O_4$ substituted phosphors exhibit higher efficiencies. However, several observations are presented to advance a better understanding of the efficiencies of the phosphors of this invention. The optimum efficiency is obtained when the $Mn^{++}$ and the $M^3M^5O_4$, e.g., $AlPO_4$, concentrations are roughly equal, i.e., within about 1%. This implies a pairing-like effect in the lattice which prevents Mn clustering with a resultant concentration quenching of the $Mn^{++}$ emission. Consistenty, the $M^3M^5O_4$, e.g., $AlPO_4$ substitution may effectively remove oxygen vacancies or pairs of vacancies which are known to act as centers for nonradiative processes in other phosphor materials. Such nonradiative processes are described by M. Tamatani et al in J. Luminescence, 12/13, 935 (1976) and by A. M. Gurvich in J. Luminescence, 15, 187, (1977).

When pure $Zn_2SiO_4$:Mn is prepared in equilibrium with ZnO or when it is reacted incompletely with ZnO as a second phase, a sharp quenching of the $Mn^{++}$ luminescence is observed. However, when it is prepared in equilibrium with $SiO_2$, or having $SiO_2$ as a second phase, normal $Mn^{++}$ luminescence is observed. Apparently, there is a slight solubility of ZnO in $Zn_2SiO_4$ such that $Zn^{+2}$ ions substitutes on the $Si^{+4}$ sites and forms an oxygen vacancy. Presumably, a small percentage of these vacancies will persist in the presence of excess $SiO_2$ even at high firing temperatures, to lower the efficiency of the phosphor.

Theoretically, the addition of low concentrations of $AlPO_4$ of about 0.5%, for example, can remove these vacancies by substituting $P^{+5}$ ion for $Si^{+4}$ ion and perhaps $Al^{+3}$ ion for $Zn^{+2}$ ion. The vacancies are essentially removed by adding a small percentage of $AlPO_4$. The remaining $AlPO_4$ substitutes for the $SiO_2$ in the lattice within the solubility limit of about 10% to 15%. Therefore, the luminescnce efficiency does not increase as the $AlPO_4$ concentration is increased above about 1%.

When other Group III - Group V oxide combinations such as a $GaPO_4$, $BPO_4$ and $GaAsO_4$ are substituted for $SiO_2$ in $Zn_2SiO_4$:Mn in accordance with the principles of this invention, luminescence efficiency is also increased but not as effectively as by substituted $AlPO_4$. Apparently, these other substitutions change the lattice parameters of $Zn_2SiO_4$, while $AlPO_4$ does not. Apparently, in Mn doped $Zn_2SiO_4$, the Mn-0 distances and bond angles with the second nearest neighbors are essentially optimized for effective $Mn^{++}$ emission. Any other substitution of ion combinations which perturbs the lattice does not cause an effective improvement in efficiency as does $AlPO_4$ which preserves the lattice.

Having thus described our invention, what we claim as new, and desire to secure by Letters Patent is:

1. Luminescent composition of a solid solution comprising $Zn_{2-y}Mn_ySi_{1-2x}Al_xP_xO_4$ having a willemite crystal structure wherein $0 < y \leq 0.25$ and $0 < x < 0.5$, wherein x is an amount sufficient to effect a luminescence efficiency that is greater than said composition absent Al and P, and wherein y is an amount sufficient to effect an emission peaked near 5230 Å.

2. Luminescent composition as set forth in claim 1 wherein:

$0 < x < 0.15$.

3. Luminescent composition of a solid solution comprising $Zn_{2-y}Mn_ySi_{1-2x}M_x^{+3}M_x^{+5}O_4$, having a willemite crystal structure, wherein $M^{+3}$ and $M^{+5}$ are ions from Groups IIIA and VA of the periodic table of the elements, wherein $0 < y \leq 0.25$ and $0 < x < 0.5$, wherein x is an amount sufficient to effect a luminescence efficiency that is greater than said composition absent $M^{+3}$ and $M^{+5}$, and wherein y is an amount sufficient to effect an emission peaked near 5230 Å.

4. Luminescent composition of a solid solution comprising $Zn_{2-y}Mn_ySi_{1-2x}(Z)_{xx}O_4$, having a willemite crystal structure, wherein Z is selected from the group consisting of AlP, GaAs, BP, GaP, BAs, and AlAs, wherein $0 < y \leq 0.25$ and $0 < x < 0.5$, wherein x is an amount sufficient to effect a luminescence efficiency that is greater than said phosphor absent z, and wherein y is an amount sufficient to effect an emission peaked near 5230 Å.

5. Method of preparing luminescent phosphor composition consisting of the steps of:

forming $M^3M^5O_4$ from $M^{+3}$ oxide and $M^{+5}$ oxide, wherein $M^{+3}$ and $M^{+5}$ are ions from Groups IIIA and VA of the periodic table of the elements; and reacting $ZnCO_3$, $SiO_2$, $MnCO_3$ with $M^3M^5O_4$ to form $Zn_{2-y}Mn_ySi_{1-2x}M_x^{+3}M_x^{+5}O_4$, having a willemite crystal structure wherein $0 < y \leq 0.25$ and $0 < x < 0.5$, wherein x is an amount sufficient to effect a luminescence efficiency that is greater than said composition absent $M^{+3}$ and $M^{+5}$, wherein y is an amount sufficient to effect an emission peaked near 5230 Å, and wherein said reacting comprises reacting $ZnCO_3$, $SiO_2$, $MnCO_3$ and $M^3M^5O_4$; at sufficiently elevated first temperatures to calcine them, and pressing the calcined material and firing it at higher second elevated temperatures until a single phase product with said willemite structure is formed.

* * * * *